April 13, 1954     M. O. NELSEN     2,675,036
ROTARY CUTTER HEAD FOR DOVETAIL GROOVE CUTTING
Filed April 21, 1951
FIG. 1.
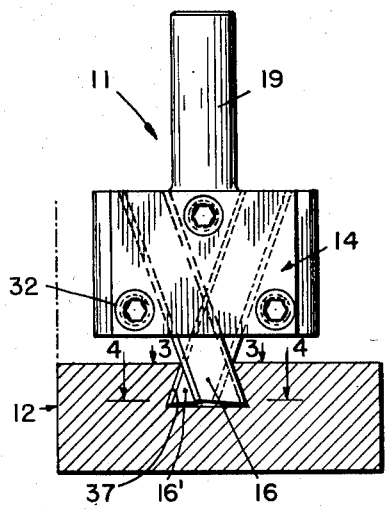
FIG. 2.
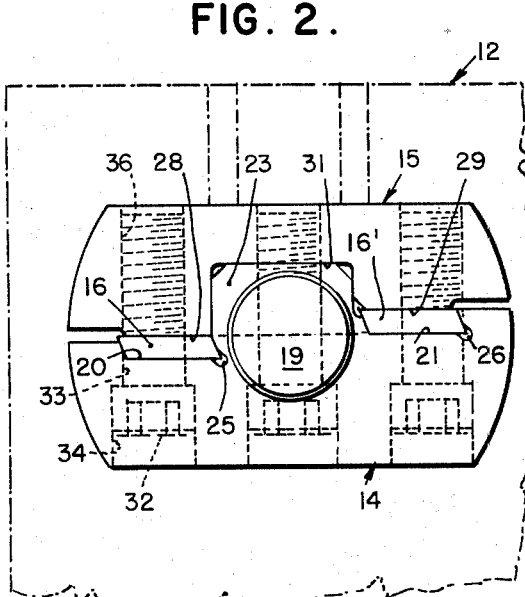
FIG. 3.
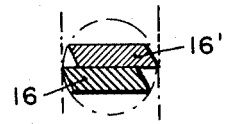
FIG. 4.
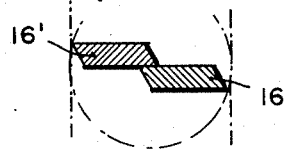
FIG. 5.
FIG. 6.
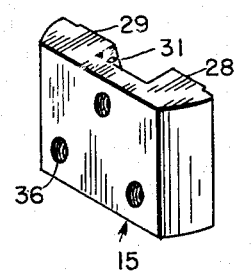
FIG. 7.
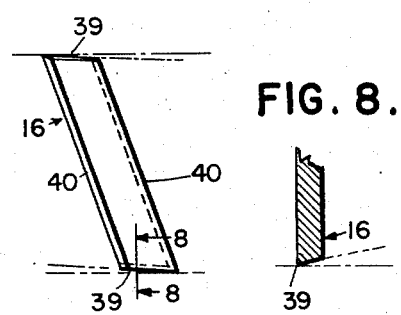
FIG. 8.
INVENTOR
MAGNUS O. NELSEN
BY
*Mason & Graham*
ATTORNEYS Patented Apr. 13, 1954

2,675,036

UNITED STATES PATENT OFFICE 2,675,036

ROTARY CUTTER HEAD FOR DOVETAIL GROOVE CUTTING

Magnus O. Nelsen, Los Angeles, Calif.

Application April 21, 1951, Serial No. 222,167

3 Claims. (Cl. 144—220)

This invention has to do with wood-working tools, particularly such tools as are designed to cut grooves.

An object of the invention is to provide a novel tool for cutting dovetail grooves in wood but which is useful for performing other cutting operations.

I am aware that there are several cutters and tools in use for cutting dovetail grooves, but so far as I know, such tools are objectionable in that they are not adjustable to cut different-sized grooves and that, once they have been used and sharpened, are not thereafter useful for cutting a groove of the same dimensions as the groove originally cut by the tool.

It therefore is an object of my invention to provide a tool for cutting dovetail grooves which obviates the above-noted disadvantages in that it is readily adjustable so that it may be used to cut different-sized grooves and to provide such a tool which can be adjusted after sharpening so that it will cut the same-size groove as before sharpening.

A particular object of the invention is to provide a simple tool having removable cutter blades which are disposed in a novel way.

These and other objects will be apparent from the drawing and the following description thereof.

Referring to the drawing:

Fig. 1 is an elevational view of a tool embodying the invention shown in cutting relation to a workpiece of wood, the latter being shown in section;

Fig. 2 is a plan view of the tool of Fig. 1 drawn to an enlarged scale;

Fig. 3 is a sectional view through the tool on line 3—3 of Fig. 1 but drawn to a larger scale;

Fig. 4 is a sectional view on the scale of Fig. 3 taken through the tool on line 4—4 of Fig. 1;

Fig. 5 is a perspective view of a portion of the tool holder;

Fig. 6 is a perspective view of the clamping plate;

Fig. 7 is a perspective view of one cutter member;

Fig. 8 is an enlarged fragmentary section on line 8—8 of Fig. 7.

More particularly describing the invention, 11 generally indicates the tool of the invention which is shown positioned above and in groove-cutting relation to a workpiece 12 of wood. The tool comprises generally a main member 14 and a secondary member 15 between which are mounted a pair of blades, indicated by 16, 16'.

The main member 14 includes a body 18 provided with a cylindrical shank 19 adapted to be received in the chuck of a suitable motor-driven machine having a revolving head. The body 18 is provided with a pair of channels or grooves 20 and 21 which are disposed generally in a V shape. The angle of each groove is the same as the angle of a side of the groove to be cut. The grooves are flat-bottomed to receive the cutters 16 and 16'. Intermediate the grooves the body 18 has a laterally projecting triangular section 23 which is disposed centrally of the body. The grooves 20 and 21 are positioned in laterally offset relation as appears from Fig. 2 wherein it can be seen that the plane of the bottom wall of groove 21 is on a plane which passes through the axis of the shank 19 while the plane of the other groove 20 is recessed in the body a distance beyond this plane equal to the thickness of the cutter member to be received therein. Thus when the cutters are received in the grooves 20 and 21 they are laterally offset so that one lies against the other in the region where they cross.

The grooves 20 and 21 are shaped to receive the particular cutters shown which are rhomboidal in cross section. Each groove is also provided with a relief recess to receive the edge of the cutter, these recesses being indicated by numerals 25 and 26.

The secondary member 15, which may be called a clamp plate, is formed on its inner surface to provide a pair of plateaus or lands 28 and 29. These are of slightly less width than the grooves 20 and 21 and are correspondingly disposed so that when the members 14 and 15 are secured together with the cutters therebetween in a manner to be described, the lands 28 and 29 overlie and bear against the cutter disposed in the grooves and hold them firmly in place. The inner surface of the member 15 is also provided with a recess 31 to accommodate the section 23 of the body of the member 14.

The clamp plate 15 and cutters are detachably secured together by screws 32 which are received in the bores 33 and counterbores 34 of the member 14 and in threaded bores 36 of the clamp plate.

The blades are mounted between the members 14 so that they project oppositely to the shank 19. It will be seen from Fig. 1 that the angle of the blades is the same as that of the sides of the dovetail groove 37 which is to be cut in the workpiece 12. It will be apparent, of course, that the dimensions of the groove may be changed by further extending or projecting the cutters and disposing the tool at a suitable distance from the work.

The blades themselves are preferably of flat, elongated shape provided with correspondingly shaped cutting edges 39 at each end and 40 at each side edge so that the blades may be reversed when one end becomes dull.

While I have illustrated and described a preferred form of my invention, I contemplate that various changes and modifications can be made without departing from the invention, the scope of which is indicated by the following claims.

I claim:

1. A dovetail groove cutting tool comprising a main member including a body having a shank, said body having a pair of cutter-receiving grooves in one side thereof, the bottoms of said grooves lying in parallel, laterally offset planes, said grooves being disposed at an acute angle to one another and converging in a direction opposite the shank, a cutter in each groove projecting beyond said member oppositely to said shank, and a clamp plate secured to the body of said main member and overlying the cutters and bearing thereon.

2. A dovetail groove cutting tool comprising a main member including a body having a shank, said body having a pair of cutter-receiving grooves in one side thereof, the bottoms of said grooves lying in parallel, laterally offset planes, said grooves being disposed at an acute angle to one another and converging in a direction opposite the shank, a cutter in each groove projecting beyond said member oppositely to said shank, a clamp plate having a pair of lands disposed correspondingly to the grooves in the body of the main member and bearing against said cutters, said lands being of less width than said grooves and being correspondingly laterally offset, and screws detachably securing said plate to the body of said main member.

3. A tool as defined in claim 2 in which the cutters partially cross and engage each other in back-to-back relation where they partially cross.

References Cited in the file of this patent

UNITED STATES PATENTS

| Number | Name | Date |
|--------|------|------|
| 544,206 | Bittenbender | Aug. 6, 1895 |
| 605,259 | Rich | June 7, 1898 |
| 914,966 | Mayer et al. | Mar. 9, 1909 |
| 2,325,020 | Shaw | July 20, 1943 |
| 2,395,628 | Kocher | Feb. 26, 1946 |